A. A. WHITLEY.
CLIP FOR STENTERING MACHINES.
APPLICATION FILED JAN. 27, 1914.

1,141,081.

Patented May 25, 1915.
2 SHEETS—SHEET 1.

WITNESSES
L. H. Grote
M. E. Keir

INVENTOR
ALFRED AUSTIN WHITLEY
By Johnson and Johnson
his Attorneys

A. A. WHITLEY.
CLIP FOR STENTERING MACHINES.
APPLICATION FILED JAN. 27, 1914.

1,141,081.

Patented May 25, 1915.
2 SHEETS—SHEET 2.

WITNESSES

INVENTOR
ALFRED AUSTIN WHITLEY
BY his Attorneys

UNITED STATES PATENT OFFICE.

ALFRED AUSTIN WHITLEY, OF MANCHESTER, ENGLAND.

CLIP FOR STENTERING-MACHINES.

1,141,081.   Specification of Letters Patent.   Patented May 25, 1915.

Application filed January 27, 1914. Serial No. 814,779.

*To all whom it may concern:*

Be it known that I, ALFRED AUSTIN WHITLEY, a subject of the King of Great Britain, residing at Clifton View, Prestwich Park south, near Manchester, in the county of Lancaster, England, have invented new and useful Improvements in Clips for Stentering-Machines, of which the following is a specification.

In the specification of Letters Patent No. 903,144 A. D. 1908, I describe and claim clips in which the gripping part of the upper jaw is made to turn upon a pin on the main, or body, part of the said jaw. This pin, I have found, is subject to a considerable amount of wear, and it is the object of my present invention to prevent this wear, as far as possible, and also to make the clips so that wedging action is obtained in gripping in such manner that there is a constant pressure between the gripping jaws whatever may be the thickness of the material being acted upon.

According to my present invention, I make the part of the main, or body portion which bears on the back of the gripping part, cam-shaped, or it may even be concentric with the center on which the upper jaw turns, provided that there is a wedging action between the main, or body, portion and the back of the said gripping part and I combine, or engage, the said gripping part with the main, or body, part so that there is sufficient play to allow of the requisite movement of the end of the main, or body, part under the said wedging action.

I will describe with reference to the accompanying drawings, constructions in accordance with my invention premising that I do not limit myself to the precise constructions illustrated.

Figure 1:
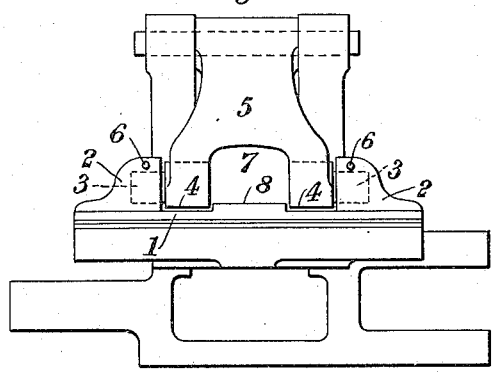
Figure 2:
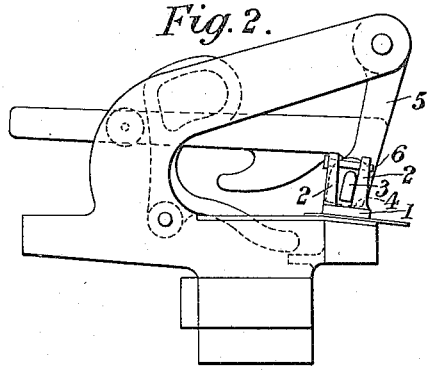
Figure 3:
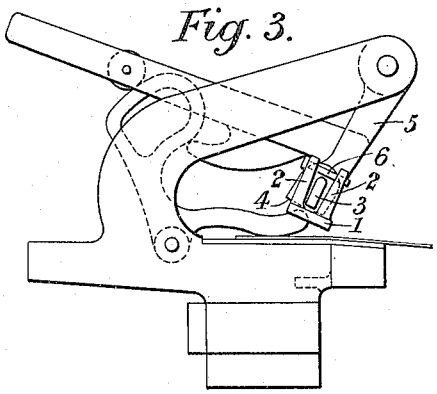
Figure 4:
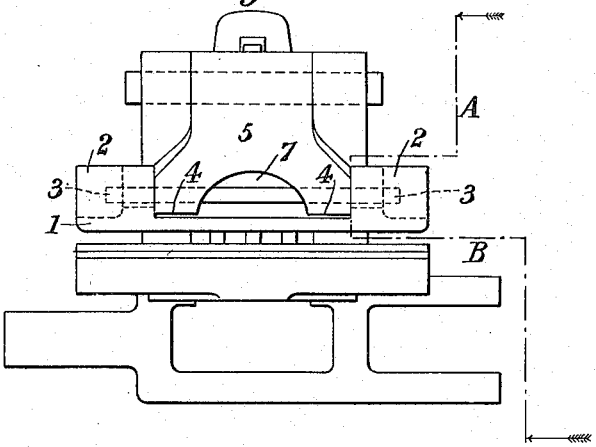
Figure 5:
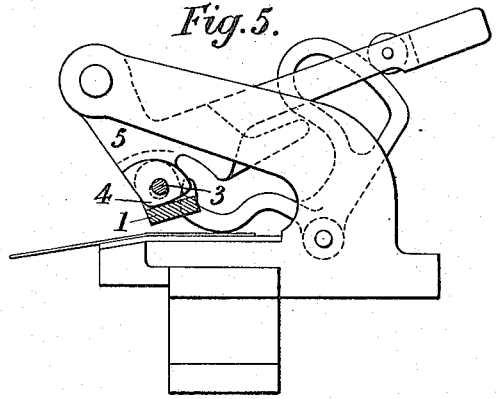
Figure 6:
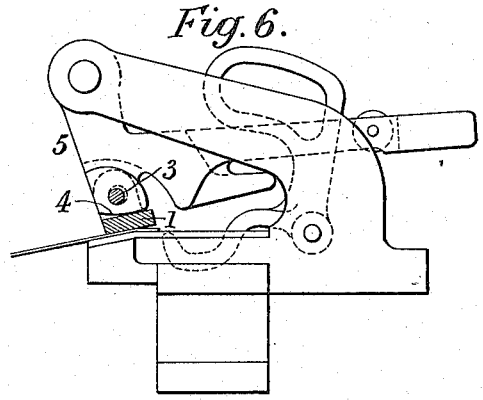

Figure 1 is a front view, Figs. 2 and 3 are side elevations, Fig. 2 showing the position when the clip is gripping the fabric and Fig. 3 the position when the clip is out of action. Fig. 4 is a front view and Figs. 5 and 6 are side elevations, partly in section on the line A. B. Fig. 4 of a modification, Fig. 5 showing the position when the clip is out of action and Fig. 6 the position when the clip is gripping the fabric.

I provide each end of the gripping part 1, of the upper jaw with a small jaw, 2, and I provide a lug, or projection, 3 at each end of the cam-shaped, or wedging, part, or parts, 4, of the main, or body, portion 5 which lugs, or projections, 3 are respectively embraced by the said small jaws, 2. A pin 6 crosses each of the said small jaws, 2, above the corresponding lug, or projection, 3 to keep the gripping part in place. The whole length of the end of the main, or body, portion 5 may be made to act as a wedge, on the back of the gripping part, 1 or only a part, or parts, thereof may be made to so act; for example, there may be (as shown in the drawings) such a part at each end of the upper, or body, portion with a gap 7 between them, with which may engage a rib, or projection, 8 from the corresponding portion of the gripping part 1.

The modification shown in Figs. 4, 5 and 6 is, in principle, the same as that shown in Figs. 1, 2 and 3, and corresponding parts are marked with the same reference numerals. The projections from each end of the cam-shaped, or wedging, parts 4, of the main, or body, portion 5, are constituted by the ends of a pin 3 passed through the said main, or body, part, and the small jaws, on the ends of the gripping part 1, are represented by the parts 2, with which the ends 3 of the pin engage, the holes for such engagement being such as to give sufficient play for the wedging action. The pins 6, of the first described construction are of course unnecessary in this modification.

I am aware that it has been proposed to provide the upper jaw with a wedge-shaped bar loosely attached to its lower end, which bar shall be gripped by the cloth and be drawn by it farther under the upper jaw and I make no claim to such an arrangement. The part which in my arrangement bears on the cloth is not wedge-shaped, but has its upper and lower faces parallel with each other and the desired effect is obtained by means of a rolling cam bearing on the said upper face so that there is no sliding or wedging action of the part which bears on the cloth and on opening my clip the cam instantly releases the gripper and no auxiliary eccentric pin and hollow shaft release arrangement is required, such as is necessary in the aforesaid prior arrangement.

What I claim is:—

1. In a stentering clip, a pivoted upper jaw, a gripping part pivotally suspended therefrom and having its upper and lower faces parallel, and a cam shaped portion on the jaw body bearing against the upper face of the gripping part whereby a wedging action is exerted only by the bearing of said cam-shaped portion of the body of the jaw upon the upper face of the gripping part, substantially as described.

2. In a stentering clip, a pivoted upper jaw, a gripping part having its upper and lower faces parallel, enlargements on the upper face of said gripping part, a pivotal engagement between said enlargement and the upper jaw, a cam shaped portion on the jaw body bearing against the upper face of the gripping part outside the area of said enlargements, whereby a wedging action is exerted only by the bearing of said cam-shaped portion of the body of the jaw upon the upper face of the gripping part, substantially as described.

In testimony whereof I have signed my name to this specification in the presence of two subscribing witnesses.

ALFRED AUSTIN WHITLEY.

Witnesses:
ERNALD SIMPSON MOSELEY,
MALCOLM SMEKUNST.

Copies of this patent may be obtained for five cents each, by addressing the "Commissioner of Patents, Washington, D. C."